A. L. SALTZMAN.
PRIMARY BATTERY.
APPLICATION FILED AUG. 14, 1912.
1,126,295.
Patented Jan. 26, 1915.
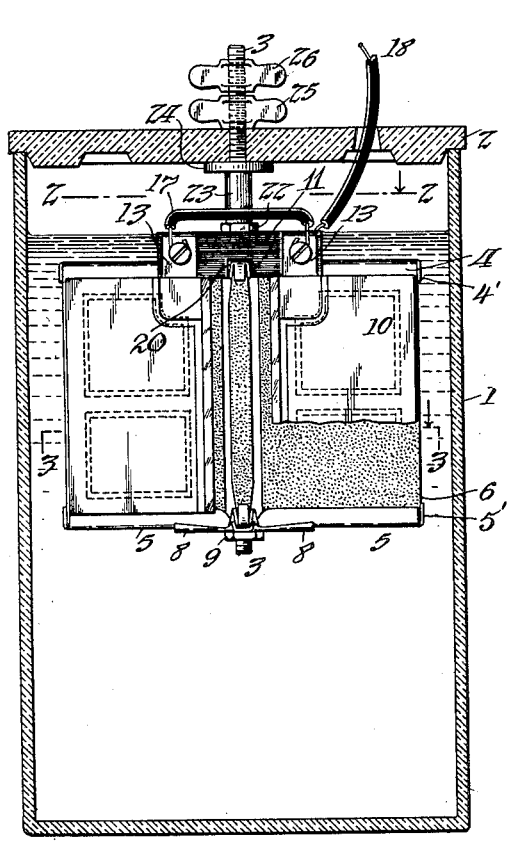
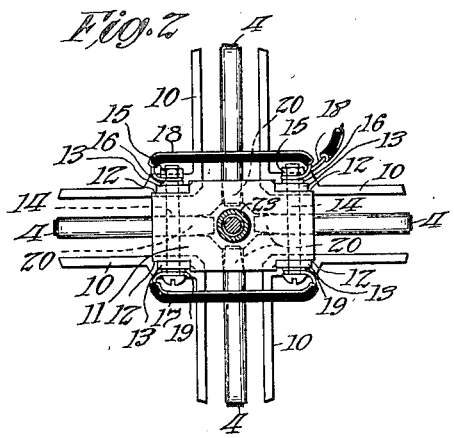
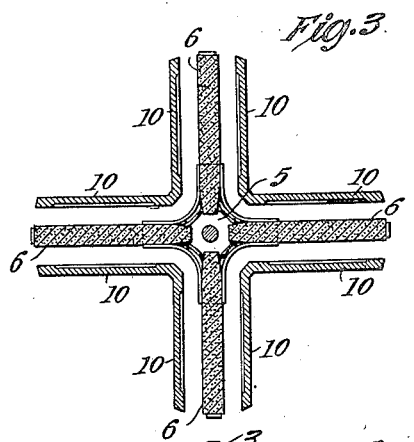
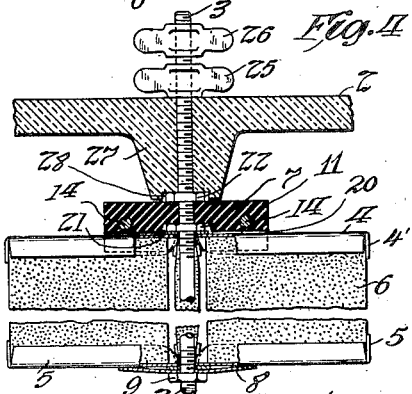
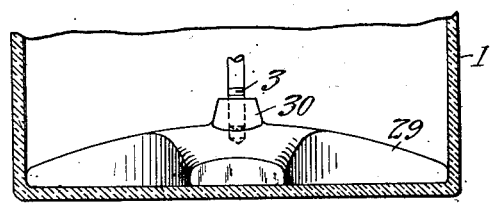
Witnesses:
Frank D Lewis
Frederick Bachmann
Inventor:
Auguste L. Saltzman
by Frank L. Dyer
his Atty.

UNITED STATES PATENT OFFICE.

AUGUSTE L. SALTZMAN, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

PRIMARY BATTERY.

1,126,295. Specification of Letters Patent. Patented Jan. 26, 1915.

Application filed August 14, 1912. Serial No. 714,967.

*To all whom it may concern:*

Be it known that I, AUGUSTE L. SALTZMAN, a citizen of the United States, and a resident of East Orange, in the county of Essex and State of New Jersey, have invented certain new and useful improvements in Primary Batteries, of which the following is a description.

My invention relates to improvements in primary batteries and particularly, but not exclusively, to that class of batteries in which the positive and negative elements are assembled in a unitary structure and supported from the battery jar cover, my invention being in some aspects an improvement on that described in the patent to Eben G. Dodge, 894,487, dated July 28, 1908 and entitled primary batteries. As in the patent to Dodge, the negative element or elements may consist of a plate or plates of oxid of copper or other depolarizing agent, and the positive element or elements may consist of a plate or plates of zinc. By the term positive element, as herein used, I mean the element or plate from which current flows through the electrolyte to the other or negative element.

The principal object of my invention is to provide a large amount of active electrode or plate surface both for a given height of the battery elements or plates and a given diameter or size of container so as to increase the capacity and efficiency of batteries of the type in question both for a given height thereof and a given volume of electrolyte.

In accordance with the above object, it is evident that for a given amount of material or surface of the elements or plates, the height of the latter in my improved battery is considerably less than with batteries heretofore in use; so that the elements or plates when suspended from a battery jar cover need not, as heretofore, project into the heavy inactive electrolyte at the bottom of the battery jar, and the efficiency of the battery is thereby increased. As the extent of active surface of the elements for a given height is increased by my invention, the effective voltage of the cell is also increased.

In carrying out the above object of my invention, I employ a number of elements or plates greater than three, that is, I employ what may be called a "multiple element" construction.

Other objects of my invention reside in the provision of a compact and strong structure of the type specified and in combination of parts and details of construction hereinafter more fully described and claimed.

In order that my invention may be better understood, attention is directed to the accompanying drawings forming a part of this specification, and in which—

Figure 1 is a vertical sectional view of a primary battery constituting one embodiment of my invention; Fig. 2 is a plan view of the parts of my invention below the line 2—2 in Fig. 1, some of the parts being shown in section taken on said line; Fig. 3 is a sectional view taken on the line 3—3 of Fig. 1 and looking in the direction of the arrow; Fig. 4 is a vertical sectional view of a portion of a primary battery constituting in part a modification of my invention, the modification consisting solely in the means for spacing the battery elements from the battery jar cover. Fig. 5 is a view partly in elevated and partly in section of means whereby the battery elements may be supported on the bottom of the battery jar.

In all the views, like parts are designated by the same reference numerals.

Referring to the drawings, at 1 is shown a primary battery jar of glass or other suitable material provided with a cover 2 of insulating material, such as porcelain, from which cover a unitary structure comprising a frame containing the positive and negative elements of the battery is adapted to be suspended by a single suspension means, as, for example, the threaded rod or bolt 3. The frame referred to comprises a plurality of upper arms 4 and lower arms 5 mounted on the bolt 3 and channel shaped in cross section, the arms 4 fitting closely over the upper and the arms 5 over the lower edges of negative plates or elements 6, which, in the preferred form of my invention, consist of plates of copper oxid suitably molded and agglomerated. The arms 4 and 5 and the edges of the negative plates fitting within the said arms are preferably beveled (see Fig. 1) so that an intimate contact is obtained. The ends of the arms 4 and 5 are provided with downturned portions 4' and upturned portions 5' respectively which serve to prevent outward movement of the negative plates 6 and to retain the same in proper position. The bolt 3 is made of conductive material such as copper or copper plated iron or steel and the arms 4 and 5 are preferably made of sheet copper or copper plated iron or steel. The arms 4 and 5 are held in firm engagement and electrical connection with the plates 6 by means of a nut 7 threaded on the bolt 3 above the arms 4 and a spring clamp 8 and nut 9 below the arms 5, the member 8 resting yieldingly in engagement with the arms 5 intermediate the bolt 3 and the outer ends of said arms.

In the preferred form of the invention as disclosed in the drawing the channel shaped members forming the arms 4 and 5 extend equal distances on opposite sides of the bolt 3, so that each of these members forms two arms, each of which rests in engagement with an edge of a separate plate. In order that all of the upper channel shaped members on the one hand and the lower channel shaped members on the other hand may lie in substantially the same horizontal plane, the lateral flanges thereof are turned outwardly into a substantially horizontal position where the arms cross and the material of one arm at this point is offset vertically to permit said arm to cross the other arm. The plates 6 and the channel arms supporting and engaging the same are arranged about the bolt 3 at an angle to each other, and the proper angular relation of the said plates and arms is maintained in part by the interengagement of the lateral flanges of the said arms adjacent the bolt 3. By drawing up the nuts 7 and 9, the arms 4 and 5 will be drawn into close engagement with the plates 6 and the latter will be held in proper angular relation with respect to each other, the plates and arms being firmly supported on the bolt 3. To assist in maintaining the arms and the negative plates in proper angular relationship with respect to each other, I preferably form the member 8 with channel shaped arms fitting over the arms 5, as shown in Fig. 1. By reason of the yielding character of the member 8, the same will be firmly held in engagement with the lower arms 5 and will effectively maintain the latter in firm engagement with the plates 6, along the whole of the lower edges of the latter.

The zinc or positive plates or elements are shown at 10 in Figs. 1, 2 and 3, these elements being located in the angular spaces between the negative elements or plates. As shown in the drawing, each zinc member is provided with two portions disposed at an angle with respect to each other, each one of these portions being located in operative position with respect to the surface of one of the negative plates between which the zinc member in question is situated. It is to be noted that each of these angular disposed portions is electrically a separate electrode or plate and that so far as applicant's invention is concerned, these portions or elements may be made separate from each other. For convenience of construction, however, I prefer to employ a single member, the angular disposed portions of which act as separate electrodes or elements, as shown.

For holding the positive elements properly spaced from each other and from the negative elements, I employ a block 11 of insulating material such as porcelain, this block being provided with angular recesses 12 (see Fig. 2) in which tabs or projections 13 on the positive plates are mounted, the said tabs being secured to the insulation block 11 by bolts 14 passing through the said tabs or projections. In the construction shown herein, four zinc members are employed, two bolts serving to secure the said members to the said insulation, each bolt securing two zinc members to the block 11. Nuts 15 are provided for the bolts 14 and washers 16 are located between the said nuts and the tabs or projections on the adjacent zinc plates. The bolts 14 and the nuts and washers herein referred to are made of conductive material and coöperate with the conductors 17 and 18 in electrically connecting the positive elements to each other. The conductor 17 is secured at its ends between the heads of the bolt 14 and washers 19 engaging the tabs or projections on the zinc plates and the conductor 18 is clamped between the nuts 15 and the washers 16, the latter being in firm contact and electrical connection with the tabs or projections on the adjacent zinc plates. The member 18 is extended beyond the bolts 14 as shown in the drawings so as to serve to conduct the current from the external circuit to the zinc plates. To permit the proper positioning of the block 11 and the positive elements or plates carried thereby with respect to the negative elements or plates, the block 11 is provided with recesses 20 in which the upper arms 4 of the frame supporting the negative plates fit closely (see Figs. 1 and 4). A recess 21 in the block 11 is adapted to receive the nut 7 so that cross arms 4 may be drawn up without hindrance in the grooves or recesses 20. A nut 22 serves to clamp the block 11 firmly against the frame carrying the negative elements. As the positive plates are firmly held in fixed relative position on the insulating block 11 and as the latter is rigidly secured in fixed position on the frame carrying the negative elements, it will be seen that when my improved battery is once assembled, the various parts and elements will be firmly held and will remain in the relative positions in which they were assembled. It is also to be noted that all the elements and plates are assembled in a compact and unitary structure which may be suspended from the cover of the battery jar by a single suspension, such as the bolt 3. In the drawings, this structure is shown of such a height that when suspended from the cover 2 the positive and negative elements are entirely located in the active electrolyte in the upper part of the battery jar. It is further to be noted that with the form of my invention herein disclosed, the number of negative elements is only one-half the number of positive elements so that these latter elements may be made of considerable thickness and plates of compressed copper oxid of considerable strength may, therefore, be employed.

For holding the unitary structure carrying the battery plates a proper distance below the cover of the battery jar, I preferably interpose a spacing collar 23, and a nut 24 of considerably larger diameter than said collar between the nut 22 and the bottom of the battery jar cover, as shown in Fig. 1, the whole plate or element supporting structure being drawn up in position with the nut 24 in engagement with the bottom of the battery jar cover by a wing nut 25 mounted on the bolt 3 above the cover and adapted to be drawn down into engagement with the upper surface thereof. An additional wing nut 26 is threaded on the stem or bolt 3 above the wing nut 25, the two wing nuts 25 and 26 affording means for connecting the conducting frame supporting the copper oxid plates to the external circuit, it being understood that the copper oxid plates are in electrical connection with the cross arms 4 and 5 and that the latter are in electrical connection with the bolt 3. If the battery jar cover be provided with a boss or projection, as shown at 27 (Fig. 4), I may omit the collar 23 and nut 24, as shown in Fig. 4, permitting nut 22 to engage the boss or projection 27. In Fig. 4, the boss or projection is provided with a recess 28 for the nut 22.

Obviously, my invention is applicable to primary batteries having a greater number of elements than herein disclosed. The elements may, if desired, be supported from the bottom of the battery jar, as shown in Fig. 5, instead of from the battery jar. Referring to Fig. 5, the numeral 29 designates base or support resting on the bottom of the battery jar and provided with a central boss or projection 30 in which the central bolt 3 is threaded, the base 29 therefore serving as a support for the unitary frame supporting the battery elements. The bolt 3 should, of course, be extended downwardly the necessary amount to insure the proper positioning of the elements in the electrolyte. Numerous other changes may be made in the specific form of my invention disclosed without departing from the spirit of my invention.

What I claim as new and desire to protect by Letters Patent of the United States is as follows:

1. In a primary battery, a plurality of negative elements angularly disposed with respect to each other and radially disposed with respect to a substantially vertical axis, a plurality of positive elements, each of said positive elements having a surface substantially parallel with a negative element surface for coöperation therewith, and means for mechanically connecting said elements together and for insulating the elements of one polarity from the elements of the other polarity, substantially as described.

2. In a primary battery, a plurality of negative elements angularly disposed with respect to each other, a plurality of positive elements arranged in the spaces intermediate said negative elements, the positive elements in each such space being angularly disposed with respect to each other, and means for mechanically connecting said elements together and for insulating the elements of one polarity from the elements of the other polarity, substantially as described.

3. In a primary battery, a plurality of negative elements angularly disposed with respect to each other, two positive elements in each space between two adjacent negative elements, each of said positive elements being operatively disposed with respect to one of said negative elements, and means for mechanically connecting said elements together and for insulating the elements of one polarity from the elements of the other polarity, substantially as described.

4. In a primary battery, a plurality of negative elements angularly disposed with respect to each other, a plurality of positive elements, each of said positive elements having a surface substantially parallel with a negative element surface for coöperation therewith, means for insulating the elements of one polarity from the elements of the other polarity, and means coacting with said insulating means for mechanically connecting said elements into a unitary structure adapted for suspension from a battery jar cover, substantially as described.

5. In a primary battery, a plurality of electrode elements of one polarity angularly disposed with respect to each other and radially disposed with respect to a common central axis, a plurality of electrode elements of the opposite polarity, means for insulating the elements of one polarity from the elements of the other polarity, and means coacting with said insulating means for mechanically connecting said elements into a unitary structure adapted for suspension from a battery jar cover, said last named means including means for connecting electrically elements of like polarity, substantially as described.

6. In a primary battery, a plurality of copper oxid plates angularly disposed with respect to each other, a plurality of zinc plates arranged in the spaces intermediate said copper oxid plates, and means for mechanically connecting said plates together and insulating the plates of one polarity from the plates of the other polarity, substantially as described.

7. In a primary battery, a plurality of negative plates angularly disposed with respect to each other, a positive member in each space between two adjacent negative plates, each of said members comprising two plate-like portions at an angle to each other, one portion for each of the adjacent negative elements, and means for mechanically connecting said plates and members together and for insulating said plates from said members, substantially as described.

8. In a primary battery, a plurality of negative plates angularly disposed with respect to each other, a positive member in each space between two adjacent negative plates, each of said positive members comprising two plate-like portions at an angle to each other, one portion for each of the adjacent negative elements, means for insulating said plates from said members, and means coacting with said insulating means for mechanically connecting said plates and members into a unitary structure adapted for suspension from a battery jar cover, substantially as described.

9. In a primary battery, a plurality of negative elements angularly disposed with respect to each other, a plurality of positive elements, arranged in the spaces intermediate said negative elements, means for insulating the elements of one polarity from the elements of the other polarity, and a conducting frame in electrical connection with said negative elements for supporting and uniting the same, substantially as described.

10. In a primary battery, a plurality of negative elements angularly disposed with respect to each other, a plurality of positive elements arranged in the spaces intermediate said negative elements, a conducting frame in electrical connection with said negative elements for supporting and uniting the same, and means supported by said frame for insulating the elements of one polarity from the elements of the other polarity, substantially as described.

11. In a primary battery, a plurality of electrode elements of one polarity angularly disposed with respect to each other, a plurality of electrode elements of the opposite polarity, means for insulating the elements of one polarity from the elements of the other polarity, and means coacting with said insulating means for mechanically connecting said elements into a unitary structure, said last named means being provided with a rod for supporting said structure within a battery jar, substantially as described.

12. In a primary battery, a plurality of negative elements angularly disposed with respect to each other, a plurality of positive elements arranged in the spaces intermediate said negative elements, a conducting frame in electrical connection with said negative elements for supporting and uniting the same, and means supported by said frame for insulating the elements of one polarity from the elements of the other polarity, said frame being provided with a single suspending means for suspending the same within a battery jar, substantially as described.

13. In a primary battery, a plurality of negative elements angularly disposed with respect to each other, a plurality of positive elements, an insulating block for spacing said elements, and means coacting with said block for mechanically connecting said elements into a unitary structure, said means including a rod for supporting said unitary structure within a battery jar, substantially as described.

14. In a primary battery, a uniform structure comprising a plurality of negative elements angularly disposed with respect to each other, a plurality of positive elements, an insulating block supporting said positive elements and spacing the same from said negative elements, and means connected with said block for supporting said negative elements, said means including a rod for supporting said unitary structure within a battery jar, substantially as described.

15. In a primary battery, a plurality of negative elements angularly disposed with respect to each other, a plurality of positive elements arranged in the spaces intermediate said negative elements, a conducting frame having angularly disposed arms in electrical connection with said negative elements for supporting and uniting the same, and an insulating block supported by said frame for insulating the elements of one polarity from the elements of the other polarity, substantially as described.

16. In a primary battery, the combination with a plurality of electrode plates, of a unitary conducting frame provided with a plurality of arms for supporting said plates at an angle to each other, the said arms being in electrical connection with the edges of said plates, substantially as described.

17. In a primary battery, the combination with a plurality of angularly disposed electrode plates, of a unitary frame provided with a plurality of conducting arms in electrical connection with the upper edges of said plates, a plurality of conducting arms in electrical connection with the lower edges of said plates, and conducting means for connecting said upper and lower arms, substantially as described.

18. In a primary battery, the combination with a plurality of angularly disposed electrode plates, of a unitary frame provided with a plurality of conducting arms in electrical connection with the upper edges of said plates, a plurality of conducting arms in electrical connection with the lower edges of said plates, and means comprising a bolt adapted for connection to a battery jar cover for connecting said upper and lower arms, substantially as described.

19. In a primary battery, the combination with a plurality of angularly disposed electrode plates, of a frame comprising conducting supporting arms engaging edges of said plates, and means for supporting said arms, said means comprising means engaging said arms intermediate the ends thereof for holding said arms in firm engagement with said plates, substantially as described.

20. In a primary battery, the combination with a plurality of angularly disposed electrode plates, of a frame comprising conducting supporting arms engaging edges of said plates, and means for supporting said arms comprising resilient means engaging said arms intermediate the ends thereof for holding said arms in firm engagement with said plates, substantially as described.

21. In a primary battery, a conducting rod substantially vertically disposed, a plurality of pairs of conducting arms radially disposed with respect to said rod and connected thereto, each of said pairs of arms comprising an upper arm and a lower arm, and a plurality of angularly disposed electrode plates, each of said plates being located between an upper arm and a lower arm of one of said pairs of arms and in contact therewith, substantially as described.

22. In a primary battery, a conducting frame comprising a rod substantially vertically disposed and a plurality of pairs of arms radially disposed with respect to said rod and connected thereto, each of said pairs of arms comprising an upper arm and a lower arm, a plurality of angularly disposed negative elements, each of said elements being located between an upper arm and a lower arm of one of said pairs of arms and in contact therewith, an insulator, a plurality of positive elements secured to said insulator, and means for securing said frame and negative elements to said insulator with said negative elements in operative relation to said positive elements, substantially as described.

23. In a primary battery, a conducting frame comprising a rod substantially vertically disposed and a plurality of pairs of arms radially disposed with respect to said rod and connected thereto, each of said pairs of arms comprising an upper arm and a lower arm, a plurality of angularly disposed negative elements, each of said elements being located between an upper arm and a lower arm of one of said pairs of arms and in contact therewith, an insulator, a plurality of positive elements secured to said insulator, and means for securing said frame and negative elements to said insulator with said negative elements in operative relation to said positive elements, said insulator being provided with means for positioning said frame and negative elements with respect to said positive elements, substantially as described.

24. In a primary battery, a supporting rod, a plurality of electrode elements of one polarity angularly disposed with respect to each other and radially disposed with respect to said rod, a plurality of electrode elements of opposite polarity, means for insulating the elements of one polarity from the elements of the other polarity, and means coacting with said rod and said insulating means for mechanically connecting said elements into a unitary structure, substantially as described.

This specification signed and witnessed this 10th day of August, 1912.

AUGUSTE L. SALTZMAN.

Witnesses:
FREDERICK BACHMANN,
ANNA R. KLEHM.